United States Patent
Aderum et al.

(10) Patent No.: US 9,718,432 B2
(45) Date of Patent: Aug. 1, 2017

(54) GAS GENERATOR

(71) Applicant: AUTOLIV DEVELOPMENT AB, Vårgårda (SE)

(72) Inventors: Tobias Aderum, Göteborg (SE); Stefan Svedjenäs, Alingsas (SE); Magnus Nabbing, Alingsas (SE); Mikael Hansson, Alingsas (SE); Niclas Hörnquist, Floda (SE); Xavier Abaziou, Landerneau (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 27 days.

(21) Appl. No.: 14/648,488

(22) PCT Filed: Nov. 25, 2013

(86) PCT No.: PCT/EP2013/074587
§ 371 (c)(1),
(2) Date: May 29, 2015

(87) PCT Pub. No.: WO2014/086607
PCT Pub. Date: Jun. 12, 2014

(65) Prior Publication Data
US 2015/0343987 A1    Dec. 3, 2015

(30) Foreign Application Priority Data
Dec. 4, 2012 (FR) ...................... 12 03286

(51) Int. Cl.
*B60R 21/261* (2011.01)
*B60R 21/264* (2006.01)
(Continued)

(52) U.S. Cl.
CPC .......... *B60R 21/264* (2013.01); *B60R 21/268* (2013.01); *B60R 21/272* (2013.01);
(Continued)

(58) Field of Classification Search
CPC ... B60R 21/261; B60R 21/264; B60R 21/268; B60R 21/272; B60R 2021/26094; B60R 2021/2642; B60R 2021/2685
See application file for complete search history.

(56) References Cited

U.S. PATENT DOCUMENTS 5,803,494 A * 9/1998 Headley ................ B60R 21/264
280/736
8,128,123 B2 * 3/2012 Johanson .............. B60R 21/264
280/737
(Continued)

FOREIGN PATENT DOCUMENTS

EP        1405775 A1    4/2004
WO   WO-2008108691 A1   9/2008
(Continued)

OTHER PUBLICATIONS

International Search Report and Written Opinion for PCT/EP2013/074587, mailed Jan. 14, 2014; ISA/EP.
(Continued)

*Primary Examiner* — Laura Freedman
(74) *Attorney, Agent, or Firm* — Stephen T. Olson; Harness, Dickey & Pierce, P.L.C.

(57) ABSTRACT

A gas generator for an airbag includes a first gas reserve with a first orifice, a first mechanism arranged for opening the first gas reserve, and a diffusion chamber arranged for diffusing the discharge gases. The generator additionally includes a mixing chamber comprising at least one first communication surface with the diffusion chamber. The gas generator further including a second mechanism comprising a second actuator and a mobile obturator between a first obstruction position, in which it obstructs a second communication surface with a diffusion chamber and a second passage position, in which the second communication surface is free.

15 Claims, 2 Drawing Sheets

(51) Int. Cl.
*B60R 21/268* (2011.01)
*B60R 21/272* (2006.01)
*C06D 5/00* (2006.01)
*B60R 21/26* (2011.01)

(52) U.S. Cl.
CPC ........ *C06D 5/00* (2013.01); *B60R 2021/2642* (2013.01); *B60R 2021/2685* (2013.01); *B60R 2021/26094* (2013.01)

(56) References Cited

U.S. PATENT DOCUMENTS

| | | | | |
|---|---|---|---|---|
| 8,393,640 | B2 * | 3/2013 | Borg | B60R 21/0134 280/736 |
| 2014/0326320 | A1 * | 11/2014 | Wellhoefer | B60R 21/263 137/1 |

FOREIGN PATENT DOCUMENTS

| WO | WO-2009090356 A1 | 7/2009 |
|---|---|---|
| WO | WO-2013029822 A1 | 3/2013 |

OTHER PUBLICATIONS

Search Report for corresponding FR Application No. 12/03286, dated Aug. 12, 2013.

* cited by examiner

GAS GENERATOR

CROSS REFERENCE TO RELATED APPLICATIONS

This application is a U.S. National Phase Application under 35 U.S.C. 371 of International Application No. PCT/EP2013/074587 filed on Nov. 25, 2013 and published as WO 2014/086607 A1 on Jun. 12, 2014. This application is based on and claims the benefit of priority from French Application No. 12/03286 filed on Dec. 4, 2012. The entire disclosures of all of the above applications are incorporated herein by reference.

FIELD

The present invention generally relates to a gas generator for inflating an airbag installed in an automobile vehicle, and in particular to a gas generator capable of diffusing into the airbag an amount of gas adapted to vehicle impact severity.

BACKGROUND

Adaptive gas generators for an airbag are known in the prior art. Document EP 2 229 296 B1 describes an adaptive gas generator comprising two igniters which may be actuated independently of each other so that each of them define an amount of gas to be diffused into the airbag. As a counterpart, this gas generator notably has a complex internal architecture with mechanisms laid out in duplicate in order that each of them open discharge orifices of each pressurized gas reserve. The result of this is that the manufacturing cost with these numerous components is high on the one hand. On the other hand, it should be noted that these mechanisms are based on the principle of supporting a thin lid during the storage, and of suppressing this support in order to open the lid. Subsequently, the opening of the second lid may pose a problem if a portion of the gas has already escaped through the first orifice so that the residual pressure in the reserve is reduced, and the supporting force may not be sufficient for pushing the support and opening the lid.

An object of the present invention is to solve the drawbacks of the document of the prior art mentioned above and in particular, first of all, to propose a gas generator which has a simple and reliable opening mechanism, while providing the possibility of adapting the flow rate of gases diffused into the airbag.

For this, a first aspect of the invention relates to a gas generator for an airbag comprising:
  a first reserve of pressurized gas with a first discharge orifice,
  a second pressurized gas reserve with a second discharge orifice,
  a first mechanism comprising a first actuator arranged for opening the first and second pressurized gas reserve,
  a diffusion chamber arranged for diffusing towards the airbag the discharged gases through the first and the second discharge orifice,
characterized in that the generator further comprises:
  a mixing chamber in direct communication with the first discharge orifice and the second discharge orifice and comprising at least one first surface of communication with the diffusion chamber,
  a second mechanism comprising a second actuator and a mobile obturator between a first obstruction position in which it obstructs a second surface of communication of the mixing chamber with the diffusion chamber and a second passage position in which the second communication surface is free, the second actuator being arranged for moving during its operation the mobile obturator from one of the first or second positions towards the other position.

SUMMARY

The mixing chamber of the gas generator according to the present application comprises the second communication surface and the second actuator, when it is actuated or ignited, is arranged for opening the second communication surface, which allows modification of the amount of gas diffused towards the airbag. The function of modifying the gas flow rate is transferred onto the mixing chamber, which suppresses the requirement of opening a second orifice in each gas reserve. Reliability is improved, since the opening of the second communication surface does not depend on the pressure in the gas reserve. It is also important to note that a single actuator (of the second mechanism) allows regulation of the flow rates of the gases from both gas reserves. In other words, the function for opening the gas reserves is independent of the function of regulating the flow rate. The functions are independent of each other, carried out by distinct components, which provides flexibility on the design, and for example allows both mechanisms to be arranged on the axis of the generator if the latter has an elongated and cylindrical shape.

Having a lid as an obturator, which, in the first obstruction position blocks the second communication surface, may be contemplated. In this case, the second actuator forces the breakage of the lid in order to have it pass into the second passage position, but the reverse cannot be done, i.e. have a lid pass from the second passage position to the first obturation position, since it is destroyed.

Advantageously, the first actuator and the second actuator are pyrotechnic igniters, in order to be able to control them electrically.

According to an embodiment, the first mechanism is arranged on the outside of the first and of the second pressurized gas reserve.

According to an embodiment, the first communication surface is defined by at least one first regulation orifice and the second communication surface is defined by at least one second regulation orifice distinct from said at least one first regulation orifice. The orifices, distinct from each other, allow them to be shifted relatively to each other so as to be able to increase freedom in designing the first and second mechanism.

According to an embodiment, the first communication surface is defined by a first portion of at least one regulation orifice and the second communication surface is defined by the remainder of said at least one regulation orifice. According to this application, manufacturing costs are reduced by using the same orifice for defining the first and second communication surface.

According to an embodiment, the first discharge orifice and the second discharge orifice each have a discharge surface, the first communication surface area is less than the sum of the discharge surface areas, which itself is less than the sum of the first and second communication surface areas. According to this application, the smallest surface for passage of the gases into the generator is either the first communication surface, if the second communication surface is obstructed, or the actual discharge orifices if the second communication surface is clear. In other words, the smallest passage section, in the case when the second communication surface is open, remains the discharge orifices which define the maximum flow rate, thereby avoiding strong pressurization of the mixing chamber, the gases of which escape through the first and second communication surface.

According to an embodiment, the first orifice is obturated by a first lid,
the second orifice is obturated by a second lid,
the first mechanism comprises a first support, mobile from a first supporting position, in which it supports the first and second lid subject to pressure from the pressurized gases, towards a second opening position, in which it no longer supports the first and second lid,
the first actuator is arranged for moving the first mobile support from the first supporting position to the second opening position, and the pressure of the pressurized gases is predefined in order to cause opening of the first and second lid when they are not supported. The pressure of the gases in the first and second gas reserve is calculated as to be able to break the first and second lid when they are no longer supported, there is no need for a projectile or mobile part for perforating the lids. It will be understood that the lids are not necessarily in direct contact with the mobile support, but they may be mounted on a jointed part or a tab inserted between the mobile support and the relevant lid.

According to an embodiment, the second actuator is arranged for moving the first mobile support from the first supporting position to the second opening position.

According to this application, there is no need for actuating the first actuator, it is the second actuator which will cause opening of the gas reserve by moving the first mobile support and by therefore simultaneously moving the obturator, in order to release the second communication surface. With a single command, the opening of the gas reserves and the release of the second surface are therefore obtained in order to have a maximum gas flow rate.

According to an embodiment, the first mobile support is arranged for sliding in the mixing chamber for passing from the first supporting position to the second opening position. The mixing chamber provides guiding functions which limits the number of components.

According to an embodiment, the first mobile support comprises two tabs each having a free end and a folding end bound to the first mobile support,
in the first supporting position of the first mobile support, the free ends of the tabs bear upon the mixing chamber, each tab supporting the first or the second lid by absorbing a force exerted by the first or second lid, subject to the pressure of the pressurized gases,
in the second opening position of the first mobile support, the free ends of the tabs are released from bearing upon the mixing chamber, so that each tab deforms in the folding end under the action of the force exerted by the first or the second lid.

According to this application, the mixing chamber provides a support for the tabs when the first support is in the first supporting position which allows simplification in the design of the tabs.

According to an embodiment, the first mobile support is controlled by a first drawer sliding in lumens of the mixing chamber, the first drawer including lumens arranged for defining in cooperation with the lumens of the mixing chamber, the first communication surface, when the first mobile support is in the second opening position. The guiding lumens of the mixing chamber are advantageously utilized also for being used as a communication orifice for the gases.

According to an embodiment, the first mobile support is rotationally mobile for passing from the first supporting position to the second opening position. The rotation of the first mobile support relatively to the mixing chamber provides simple kinematics.

According to an embodiment, the first mobile support comprises a deformable portion connected to the generator, and it passes from the first supporting position to the second opening position by deforming the deformable portion. In other words, the first mobile support according to this application is a tab with a free end which supports the lids, and the other end is attached to the body of the generator. The movement of the free end can only be performed by folding or deforming the first mobile support.

According to an embodiment, the mobile obturator is guided in lumens of the mixing chamber. It includes lumens arranged for defining the second communication surface, in communication with the lumens of the mixing chamber, when the mobile obturator is in the second passage position. The guiding lumens of the mixing chamber are advantageously utilized for also being used as a communication orifice for the gases.

According to an embodiment, the mobile obturator is arranged for sliding in the mixing chamber in order to pass from the first obstruction position to the second passage position.

According to an embodiment, the mobile obturator is mobile in rotation in order to pass from the first obstruction position to the second passage position. The rotation of the mobile obturator relatively to the mixing chamber allows simple kinematics.

A second aspect of the invention is a safety module comprising at least one inflatable bag and at least one gas generator according to the first aspect of the invention.

A last aspect of the invention is an automobile vehicle including at least one gas generator according to the first aspect of the invention.

BRIEF DESCRIPTION OF THE DRAWINGS

Other features and advantages of the present invention will become more clearly apparent upon reading the detailed description which follows of an embodiment of the invention given as an example which is by no means limiting and is illustrated by the appended drawings wherein.

DETAILED DESCRIPTION

Figure 1:
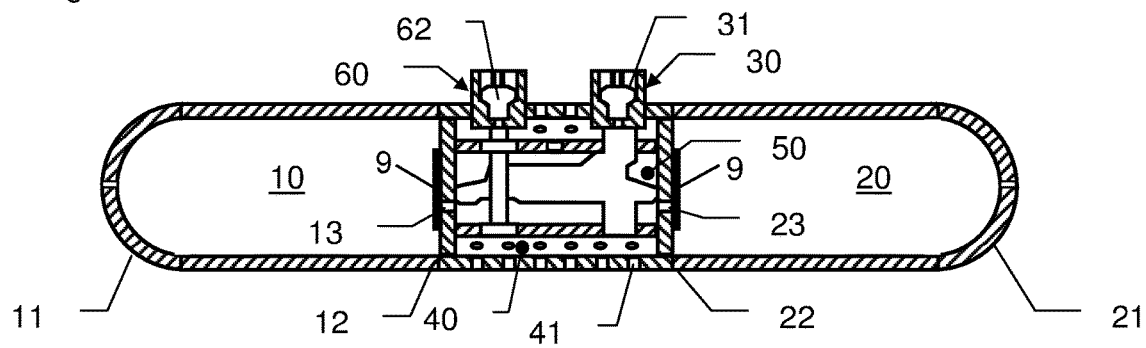
FIG. 1 illustrates a general sectional view of a gas generator according to the present invention.

FIG. 1 illustrates a gas generator with two gas reserves 10 and 20. Each of these two gas reserves is of a cylindrical shape, closed at one end 11 and 21 with a plug and attached at the other end 12 and 22 to a diffusion chamber 40 which itself includes a mixing chamber 50.

The diffusion chamber 40 has orifices 41 for diffusing towards the airbag the gases from the gas reserves 10 and 20 when the latter are open. For this purpose, each gas reserve 10 and 20 comprises a discharge orifice (13 for the first gas reserve, 23 for the second gas reserve), arranged on the side of the diffusion chamber 40 and sealed by a lid 9 of small thickness.

The gas reserves 10 and 20 each contain pressurized gases. In particular, one of the gas reserves may include a mixture of gases comprising a combustible gas, and the other gas reserve a mixture containing an oxidizing gas. During the simultaneous opening of the gas reserves 10 and 20, the combustible gas will encounter at the mixing chamber 50 the oxidizing gas and combustion will be able to be initiated in order to increase the inflatory power of the gas generator. It is notably possible to use dihydrogen as a combustible gas and dioxygen as an oxidizing gas.

As this will be explained in FIGS. 2 to 4, a first mechanism 30 comprising the pyrotechnic igniter 31 is arranged for opening both gas reserves, and a second mechanism 60 comprising the pyrotechnic igniter 62 is arranged for regulating the flow rate of diffused gases towards the airbag.

Figure 2:
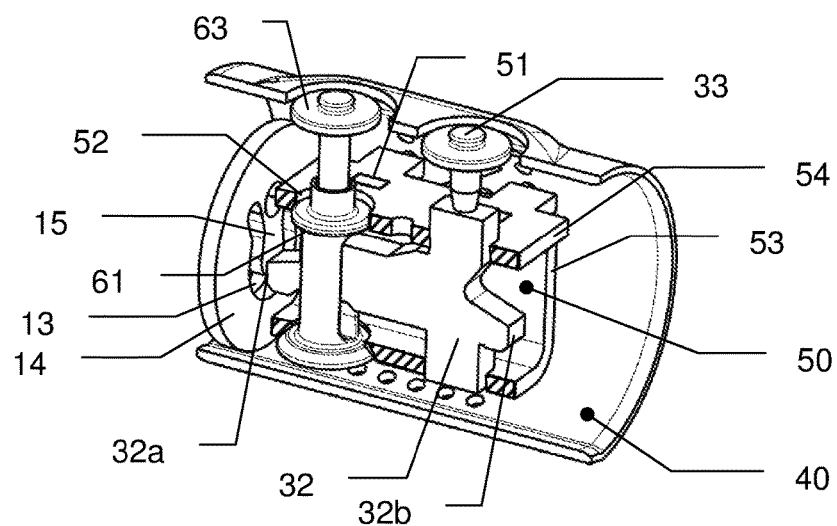
FIG. 2 illustrates a detail of FIG. 1, the mixing chamber and the mechanisms of the generator of FIG. 1, in a storage phase.

FIG. 2 illustrates the gas generator of FIG. 1 at the diffusion chamber 40. For reasons of clarity, the gas reserves 10 and 20 are not illustrated. However, the wall 14 is seen, in which is pierced the first discharge orifice 13 of the first gas reserve 10. A tab 15 is also implanted in the wall 14 for supporting the lid (not visible because located behind the wall 14) which seals the first gas reserve 10. The same architecture is used for the second gas reserve 20.

The diffusion chamber 40 contains a mixing chamber 50 formed by the walls 53 and 54, which comprises orifices 51 which are open and 52 which are closed by a mobile obturator 61. The operation of the second mechanism 60 will be explained in FIG. 4.

Further, the mixing chamber 40 contains a mobile support 32, here illustrated in a first position, in which the end 32a supports the tab 15, and the end 32b supports the tab not shown of the wall of the second gas reserve 20. The first mechanism comprising a piston 33 between the igniter 31 and the mobile support 32, the operation of the first mechanism will be explained in FIG. 3.

Figure 3:
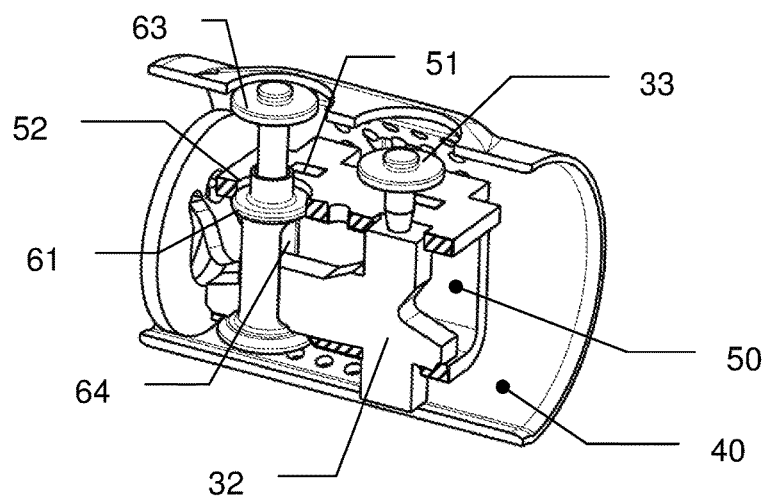
FIG. 3 illustrates the actuated opening mechanism and the open gas reserves.

FIG. 3 illustrates the gas generator of FIG. 1 at the diffusion chamber 40, with the first mechanism actuated in order to release the gases from the gas reserves 10 and 20. For this purpose the first pyrotechnic igniter 31 has been actuated and has released pressurized gases so that the piston 33 was pushed downwards, driving the mobile support 32 from the first position at the (FIG. 2), to the second position as shown, wherein the tab 15 and that of the second wall of the second gas reserve (not shown) are no longer supported by the ends 32a and 32b, so that they fold towards the mixing chamber, causing breakage of the lids 9 which are no longer supported. The gases contained in each of the gas reserves 10 and 20 then flow into the mixing chamber 50 and may escape therefrom through the orifices 51 which form communication surfaces between the mixing chamber 50 and the diffusion chamber 40.

In the case of reactive gases stored in the gas reserves 10 and 20, the hot particles generated by the first pyrotechnic igniter 31 may initiate combustion of these gases when they mix in the mixing chamber 50, when they are in the diffusion chamber 40 or when they are in the airbag.

Figure 4:
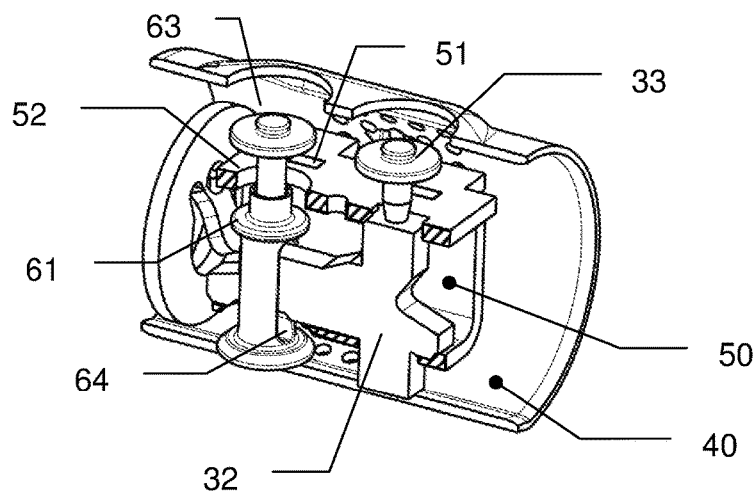
FIG. 4 illustrates the second actuated mechanism.

FIG. 4 illustrates the gas generator of FIG. 1 at the diffusion chamber 40, with actuation of the second mechanism. In order to increase the flow rate of the gases from the gas reserves 10 and 20 towards the airbag, if there is a need for this, the second mechanism 60 may be actuated, in order to increase the passage surface area between the mixing chamber 50 and the diffusion chamber 40. For this purpose, the second pyrotechnic igniter 62 is fired and pushes the mobile obturator 61 by pushing the piston 63 away downwards. In this way, the orifices 52 are found cleared of the shoulders of the mobile obturator 61, which provides an additional passage from the mixing chamber 50 to the diffusion chamber 40.

It should be noted that the mobile support 32 slides in openings of the wall 53 and 54 of the mixing chamber, but also in a groove 64 of the mobile obturator 61. Further, in FIG. 2, the mobile support 32 is in abutment upon the mobile obturator 61, so that it has to be noted that the actuation of the second igniter 62 which has the effect of moving down the mobile obturator 61 will also have the effect of causing the mobile support 32 to move down from the first position, as illustrated in FIG. 2, towards the second position, as illustrated in FIG. 4. In other words, the groove 64 allows the mobile obturator 61 to be bound with the mobile support 32 if the latter has not been pushed beforehand into the second position. Therefore it is possible by only actuating the second igniter 62 to open both gas reserves 10 and 20, and simultaneously open the second passage surfaces formed by the orifices 52.

Figure 5:
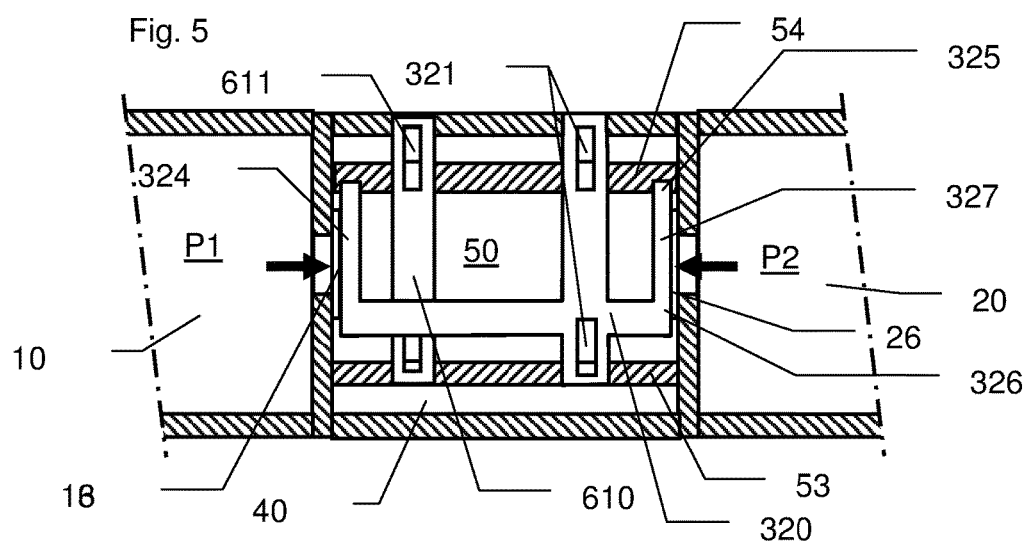
FIG. 5 illustrates an alternative for making the mobile support during the storage phase of the gases.

FIG. 5 illustrates an alternative embodiment for the mobile support. The mixing chamber 50, always included in the diffusion chamber 40 and separated from the latter by the partitions 54 and 53, comprises a mobile support 320 which supports both lids 16 and 26 of the gas reserves 10 and 20 respectively. Each lid 16 and 26 is subject to a pressure force P1 and P2 respectively as illustrated by the arrows. The mobile support 320, in the supporting position, comprises two tabs 324 and 327. Only the tab 327 is described in detail hereafter. This tab comprises two ends 325 and 326. The end 326 is connected to the body of the mobile support 320, and the end 325 is free, but fitted into a notch of the partition 54, so that the pressure forces of pressure P2 exerted on the tab 327 by the lid 26 are absorbed at least partly by the partition 54. This load-spreading imparts good robustness to the gas generator: pressure variations due to the temperatures or to the variability of the gas-loading machines will not cause untimely opening of the lids 16 and 26.

The mobile support 320 as well as the mobile obturator 610, are guided in lumens of the partitions 53 and 54. Further, the mobile support 320 includes a lumen 321 at its guided portion in the partition 54. Also, the mobile obturator 610 comprises a lumen 611 at its guided portion in the partition 54. The lumens 611 and 321 are arranged so that in the position as illustrated, no gas may pass into these lumens 611 and 321, since they do not open into the mixing chamber 40.

Figure 6:
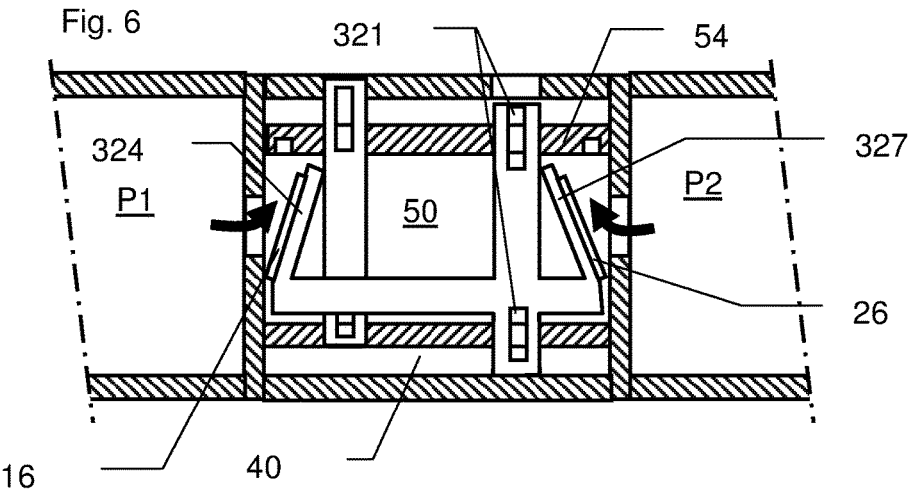
FIG. 6 illustrates the mobile support of FIG. 5, after operation of the first actuator.

FIG. 6 illustrates the mobile support 320 of FIG. 5 which has been pushed into its opening position by a pyrotechnic igniter not shown. In this opening position, the free ends of the tabs 324 and 327 of the mobile support 320 are no longer fitted into the partition 54, so that the pressure forces P1 and P2 exerted by the lid 16 and 26 will cause the folding of each tab 324 and 327 as illustrated and cause opening of the discharge orifices, clearing the gas passage, as shown by the arrows.

Once the mobile support 320 is in its opening position, the lumens 321 open into the mixing chamber and into the diffusion chamber 50, so that gases may pass therein for crossing the partition 54 and going into the diffusion chamber 40.

It will be understood that diverse modifications and/or obvious improvements for one skilled in the art may be made to the different embodiments of the invention described in the present description without departing from the scope of the invention as defined by the appended claims. In particular, reference is made to dihydrogen and dioxygen as reactive gases, but it is possible to contemplate the use of hydrocarbons for example. Reference is also made to a mobile obturator between a first obstruction position in which it obstructs a second communication surface with the diffusion chamber, and a second passage position in which the second communication surface is free. A lid which obstructs the second communication surface and which would be destroyed by the second actuator is included in this definition.

The invention claimed is:

1. A gas generator for an airbag comprising:
a first pressurized gas reserve with a first discharge orifice,
a second pressurized gas reserve with a second discharge orifice,
a first mechanism comprising a first actuator arranged for opening the first and second pressurized gas reserves;
a diffusion chamber arranged for diffusing towards the airbag the gas discharged by the first and second discharge orifices;
a mixing chamber in direct communication with the first discharge orifice and the second discharge orifice, and including at least one first communication surface with the diffusion chamber; and
a second mechanism having a second actuator and a mobile obturator between a first obstruction position, in which the mobile obturator obstructs a second communication surface of the mixing chamber with the diffusion chamber, and a second passage position, in which the second communication surface is free, the second actuator, when actuated, being arranged for moving the mobile obturator from one of the first or of the second position to the other position.

2. The generator according to claim 1, wherein the first communication surface is defined by at least one regulation orifice and in that the second communication surface is defined by at least one second regulation orifice distinct from the at least one first regulation orifice.

3. The generator according to claim 1, wherein the first communication surface is defined by a first portion of at least one regulation orifice and the second communication surface is defined by the remainder of the at least one regulation orifice.

4. The generator according to claim 1, wherein:
the first orifice is obturated by a first lid,
the second orifice is obturated by a second lid, in that the first mechanism includes a first support, mobile from a first supporting position, in which the first support supports the first and second lids being subjected to pressure of the pressurized gases, towards a second opening position, in which the first support no longer supports the first and second lids,
the first actuator is arranged for moving the first mobile support from the first supporting position towards the second opening position,
the pressure of the pressurized gases is predefined for causing the opening of the first and second lids when the first and second lids are not supported.

5. The generator according to claim 4, wherein the second actuator is arranged for moving the first mobile support from the first supporting position towards the second opening position.

6. The generator according to claim 4, wherein the first mobile support is arranged for sliding in the mixing chamber in order to pass from the first supporting position towards the second opening position.

7. The generator according to claim 4, wherein:
the first mobile support includes two tabs each having a free end and a folding end bound to the first mobile support,
in the first supporting position of the first mobile support, the free ends of the tabs bear upon the mixing chamber, each tab supporting the first or the second lid by withstanding a force exerted by the first or the second lid subject to the pressure of the pressurized gases,
in the second opening position of the first mobile support, the free ends of the tabs are released from bearing upon the mixing chamber, so that each tab deforms in the folding end under the action of the force exerted by the first or second lid.

8. The generator according to claim 4, wherein the first mobile support is controlled by a first drawer sliding in cavities of the mixing chamber, the first drawer including cavities arranged for defining in cooperation with the cavities of the mixing chamber the first communication surface, when the first mobile support is in the second opening position.

9. The generator according to claim 4, wherein the first mobile support is mobile in rotation in order to pass from the first supporting position to the second opening position.

10. The generator according to claim 4, wherein the first mobile support includes a deformable portion connected to the generator, and the first mobile support passes from the first supporting position to the second opening position by deforming the deformable portion.

11. The generator according to claim 1, wherein the mobile obturator is guided in cavities of the mixing chamber, and the mobile obturator includes cavities arranged for defining the second communication surface, cooperating with the cavities of the mixing chamber, when the mobile obturator is in the second passage position.

12. The gas generator according to claim 1, wherein the mobile obturator is arranged for sliding in the mixing chamber in order to pass from the first obstruction position to the second passage position.

13. The gas generator according to claim 1, wherein the mobile obturator is mobile in rotation in order to pass from the first obstruction position to the second passage position.

14. The gas generator of claim 1, in combination with a safety module having at least one inflatable bag.

15. The gas generator according to claim 1, in combination with an automobile.

* * * * *